United States Patent [19]

Todoki

[11] Patent Number: 5,724,626
[45] Date of Patent: Mar. 3, 1998

[54] PHOTOSENSITIVE MATERIAL TRANSPORTING APPARATUS

[75] Inventor: Kenji Todoki, Wakayama, Japan

[73] Assignee: Noritsu Koki Co., Ltd., Wakayama-ken, Japan

[21] Appl. No.: 736,442

[22] Filed: Oct. 24, 1996

[30] Foreign Application Priority Data

Oct. 25, 1995 [JP] Japan ................... 7-277796

[51] Int. Cl.⁶ ................... G03D 3/08; G03B 27/32
[52] U.S. Cl. ................... 396/612; 355/27; 271/286; 271/298; 271/300; 396/616
[58] Field of Search ................... 396/570, 612, 396/620; 355/27–29, 72; 271/14, 286, 84, 267, 298–300

[56] References Cited

U.S. PATENT DOCUMENTS

| | | | |
|---|---|---|---|
| 4,126,391 | 11/1978 | Nishimoto | 355/27 |
| 4,705,376 | 11/1987 | Schaub et al. | 396/570 |
| 4,864,355 | 9/1989 | Knecht et al. | 355/27 |
| 4,926,211 | 5/1990 | Ozawa | 396/612 |
| 5,430,520 | 7/1995 | Toki et al. | 396/612 |
| 5,446,520 | 8/1995 | Todoki | 396/570 |

*Primary Examiner*—D. Rutledge
*Attorney, Agent, or Firm*—Felfe & Lynch

[57] ABSTRACT

A photosensitive material transporting apparatus includes a transport passage for transporting a plurality of developed photosensitive materials in parallel with each other with a phase difference therebetween in a transporting direction thereof, a photosensitive material receiving mechanism disposed downstream of the transport passage for receiving the photosensitive materials, and a transport conveyer disposed between an exit of the transport passage and the photosensitive material receiving mechanism and having a conveying passage extending substantially normal to a discharging direction of the photosensitive materials discharged from the exit. The apparatus further includes a transporting pinch roller mechanism disposed along the transport passage of the photosensitive materials and capable of transporting the materials by pinching them, a discharging pinch roller mechanism disposed at the exit of the transport passage and having a higher transporting speed than the transporting pinch roller mechanism and a torque limiter attached to a roller of of the discharging pinch roller mechanism for rendering the roller freely rotatable in response to a torque greater than a predetermined value.

6 Claims, 4 Drawing Sheets

PHOTOSENSITIVE MATERIAL TRANSPORTING APPARATUS

BACKGROUND OF THE INVENTION

1. Field of the Invention

The present invention relates to a photosensitive material transporting apparatus including a transport passage for transporting developed photosensitive material, a transporting pinch roller mechanism disposed along the transport passage and capable of transporting the photosensitive material by pinching it, and a discharging pinch roller mechanism disposed at an exit, of the transport passage and having a higher transporting speed than the transporting pinch roller mechanism. In this type of apparatus, generally a plurality of photosensitive materials are transported in parallel, with the materials being phase-staggered relative to each other in the transporting direction. On the downstream side, the apparatus further includes a photosensitive material receiving mechanism disposed downstream on the transport passage for receiving the photosensitive materials and a transport conveyer interposed between the exit of the transport passage and the photosensitive material receiving mechanism and having a conveying passage extending substantially normal to the discharging direction of the photosensitive materials discharged from the exit of the transport passage.

2. Description of the Related Art

The construction of a photographic printing-developing system 1 including a photosensitive material transporting apparatus 1 (to be referred to also as an 'arraying apparatus') having the above-described construction will be described briefly with reference to FIG. 1.

The system 2 includes a printing-exposing section 3 and a developing section 4. At the most, downstream portion of the developing section 4, there is disposed a photosensitive material arraying apparatus 1 to which the present invention relates.

Referring to the transported condition of photosensitive materials 50 in the photographic printing-developing system 2. first the printed and exposed photosensitive materials 50 are serially arranged and sent in this condition to a juxtaposing device 13, where the materials 50 are juxtaposed one after another in the direction normal to the transporting direction into a phase-staggered parallel formation as shown, in FIGS. 2 and 3. And, under this formation, the materials 50 are charged into a developing tank 14. The phase-staggered parallel formation of the materials 50 is maintained inside the developing tank 14 and also a following drying section 15 until an entrance of the photosensitive material arraying apparatus 1 relating to the invention.

Then, as shown particularly in FIG. 2, a discharging pinch roller mechanism 23 disposed at the exit of the transport passage discharges these materials 50 at a high speed onto a transport conveyer 18 and the materials are conveyed on the conveyer 18 to be eventually received by a photosensitive material receiving mechanism (e.g. a sorter) 19 disposed at the downstream end of the transport conveyer 18.

In short, while being transported in the printing-exposing section 3, the plurality of photosensitive materials 50 are serially arranged in a line. Then, the materials 50 are re-arranged into the phase-staggered parallel formation relative to the transporting direction and transported and processed under this condition in the following developing and drying processed. Thereafter, these developed and dried materials 50 are discharged one after another onto the transport conveyer 18 described above and thus re-arranged (arrayed) into the serial formation, under which condition the materials are eventually received by the photosensitive material receiving mechanism 19.

With the conventional photosensitive material arraying apparatus having the above-described construction, a high-speed discharging roller mechanism is disposed at the exit of the transport passage, and also on the upstream of this discharging roller mechanism, a plurality of transporting pinch roller mechanism are disposed along the transport passage.

The transporting speed of the transporting pinch roller mechanisms is set to be lower than a half of that of the high-speed discharging roller mechanism. Accordingly, the photosensitive materials are subjected to an unnecessary tension due to the speed difference. In order to avoid this problem, the convention provides that rollers of those transporting pinch roller mechanisms disposed relatively adjacent the high-speed discharging roller mechanism are constructed as one-way rollers.

However, in the case of the above construction, in order also to cope with differing lengths of the photosensitive materials, a relatively large number of transporting pinch roller mechanisms need to be constructed as the one-way rollers, so that the apparatus cost tends to increase.

Moreover, in the juxtaposing direction of the photosensitive materials extending normal to their transporting direction, the transporting speed of a leading photosensitive material pinched by the high-speed discharging pinch roller differs from that of a next photosensitive material which is being transported in another lane with a delay relative to to the former and not yet pinched by the high-speed discharging roller. In order to cope with this speed difference in the juxtaposing direction, it is necessary for the transporting pinch rollers aligned in this juxtaposing direction to be rotatable independently of each other. This further increases the apparatus cost.

SUMMARY OF THE INVENTION

Accordingly, a primary object of the present invention is to provide a photosensitive material transporting apparatus which may be constructed at minimum costs for achieving the predetermined function through improvement of its construction about the exit of the transport passage of the photosensitive materials.

For fulfilling the above-noted object, a photosensitive material transporting apparatus, according to the present invention, comprises:

- a transport passage for transporting developed photosensitive material;
- a transporting pinch roller mechanism disposed along the transport passage of the photosensitive material and capable of transporting the material by pinching it;
- a discharging pinch roller mechanism disposed at an exit of the transport passage and having a higher transporting speed than the transporting pinch roller mechanism; and
- a torque limiter attached to a roller of of the discharging pinch roller mechanism for rendering the roller freely rotatable in response to a torque greater than a predetermined value.

With the above construction, the photosensitive materials as pinched by the transporting pinch mechanism are transported at a predetermined speed one after another toward the exit of the transport passage. When the photosensitive material has been transported to the vicinity of the exit of the transport passage, this material comes to be pinched by both the upstream transporting pinch roller mechanism and the downstream discharging pinch roller mechanism, whereby the material is subjected to tension due to the transporting speed difference. Yet, according to the invention, the discharging pinch roller mechanism includes a torque limiter which renders the roller of this mechanism freely rotatable when the torque applied to this roller exceeds a predetermined value. Accordingly, this torque applied to the roller does not exceed the predetermined value, so that it is possible to prevent the photosensitive material from being subjected to an excessive tension and damaged thereby.

Further, in the case of this construction of the invention, unlike the conventional construction described hereinbefore, it is not necessary to construct the plurality of transporting pinch roller mechanisms disposed upstream of the discharging pinch roller mechanism as one-way rollers. Instead, these roller mechanisms may be constructed as ordinary roller mechanisms. The sole requirement is the provision of the torque limiter to the discharging pinch roller mechanism. Consequently, the apparatus may be constructed at low costs.

Moreover, in the case of the construction of the present invention, the transporting pinch roller mechanism does not have to cope with the speed difference between the photosensitive materials transported in parallel in the juxtaposing direction normal to the transporting direction. Therefore, only one transporting pinch roller mechanism is needed in this juxtaposing direction, instead of the coventional construction needing a group of independently rotatable roller mechanisms along this direction. Then, in this respect too, the construction of the present invention may be provided at lower costs.

Preferable, in the above-described construction, the discharging pinch roller mechanism includes a large drive roller and a small driven roller contactable with the drive roller to be rotatable in unison therewith and a plurality of guide rollers coaxial with the driven roller and disposed across the driven roller along a conveying passage of the transport conveyer, and the guide roller has a greater diameter than the driven roller.

If the discharging pinch roller mechanism has the above-described construction, when the photosensitive material is discharged from this mechanism, the material is curved in cross section thereof as being transported on the driven roller and the guide rollers disposed across the driven roller, and the material is discharged under this curved condition onto the transport conveyer (see FIGS. 3 and 4). Accordingly, when discharging a long photosensitive material such as of a panoramic size, there occur no such problems as sagging of the leading end of this photographic material, or the sagging end inadvertently coming into contact with the transport conveyer to generate static electricity which in turn sticks the material to the conveyer. Furthermore, when such long photosensitive material is discharged from the discharging pinch roller mechanism disposed on the side of the photosensitive material receiving mechanism, there occurs no overlapping interference between this material and a foregoing material being transported on the conveyer toward the receiving mechanism.

Further and other objects, features and effects of the invention will become more apparent from the following more detailed description of the embodiments of the invention with reference to the accompanying drawings.

DETAILED DESCRIPTION OF THE PREFERRED EMBODIMENTS

Preferred embodiments of the present invention will be described in details with reference to the accompanying drawings.

Figure 1:
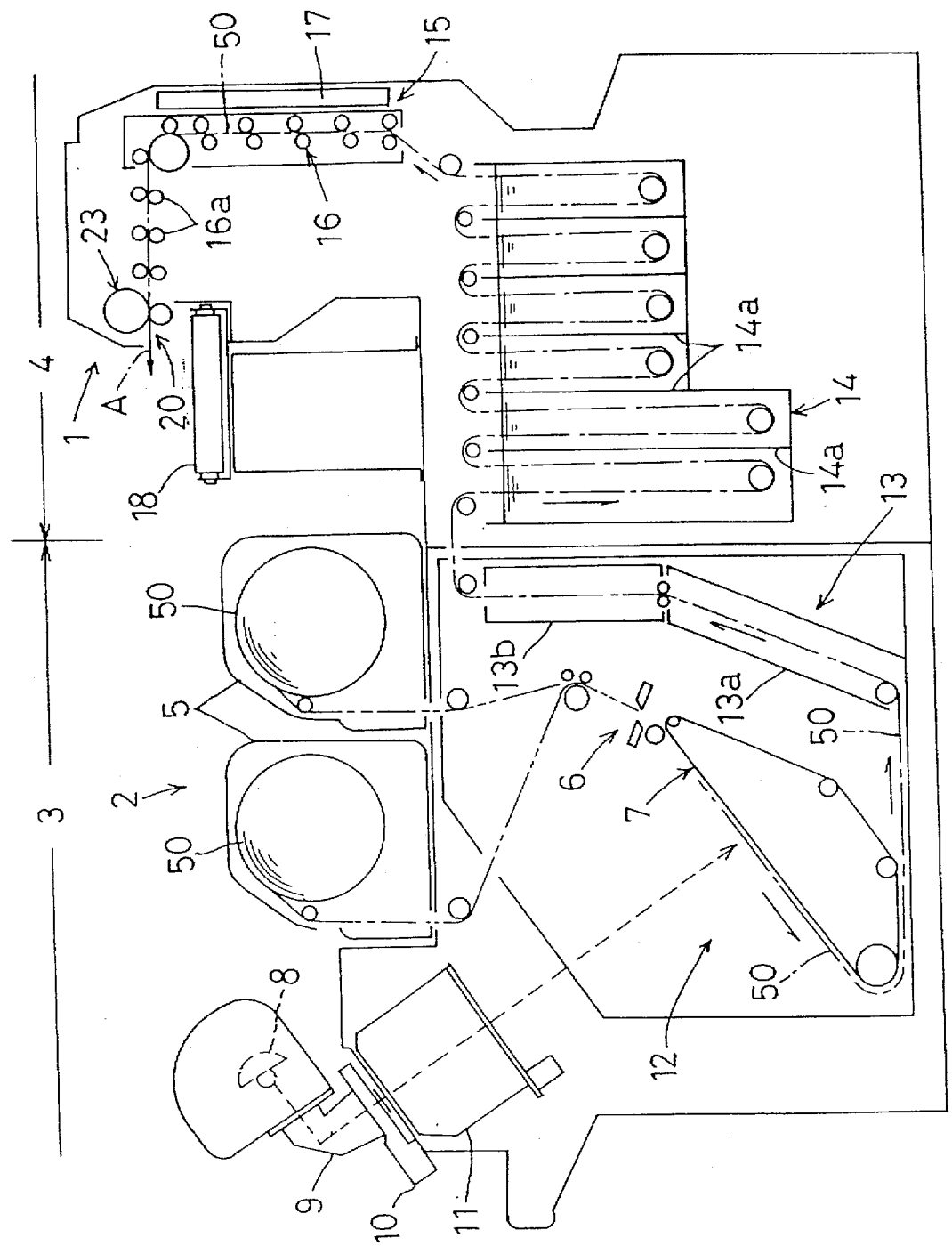
FIG. 1 is a schematic construction view of a photographic printing-developing system incorporating a photosensitive material arraying apparatus relating to the present invention.

FIG. 1 is a schematic overall construction view of a photographic printing-developing system 2 incorporating a photosensitive material arraying apparatus 1 relating to the present invention. In the figure, numeral 3 denotes a printing-exposing section and numeral 4 denotes a developing section. The construction of the printing-exposing section 3 is conventional. Therefore, only the names of its components will be described. Numeral 5 denotes magazines each storing therein photosensitive material 50 in a rolled state. Numeral 6 denotes a cutter. Numeral 7 denotes a suction belt for transporting the material. Numeral 8 demotes a light source. Numeral 9 denotes a mirror tunnel. Numeral 10 denotes a negative mask. And, numeral 11 denotes a lens unit.

The printed and exposed photosensitive materials 50 are serially transported on a conveyer 12 along the direction of arrows to a juxtaposing device 13. This juxtaposing device 13 functions to juxtapose the serially transported materials 50 into a three-lane, phase-staggered formation and then to forward the materials downstream under this condition. For providing these functions, the juxtaposing device 13 includes a juxtaposing unit 13a for juxtaposing the photosensitive materials 50 and a conveyer 13b for forwarding the juxtaposed photosensitive materials 50 in the transporting direction. Accordingly, by the function of this juxtaposing device 13, the photosensitive materials 50 are arranged into the three-lane, phase-staggered formation having phase differences in the transporting direction (i.e. the direction denoted by the arrows in the figure). For this reason, the juxtaposing unit 13a described above includes a movable table (not shown) for shifting the coming photosensitive materials 50 relative to each other in the direction normal to the transporting direction.

Downstream of the juxtaposing device 13, the developing section 4 is disposed.

This developing section 4 includes, along the transporting direction of the photosensitive materials, a developing tank 14 for holding processing liquids therein, a drying section 15, and the photosensitive material arraying apparatus 1.

The inside of the developing tank 14 is divided by means of partition plates 14a into a plurality of sections which respectively hold therein a plurality of kinds of processing liquid needed for the developing operation. As shown, the transport passage of the photosensitive materials 50 extends through the respective sections, so that the materials 50 may be caused to pass these sections one after another.

The drying section 15 includes a plurality of transporting pinch roller mechanisms 16 (each mechanism is comprised of a pair of mutually contacting rollers) disposed along the transporting direction and a heater 17 disposed beside the transport passage for drying the materials 50 while being caused to pass this section 15.

Thereafter, the dried photosensitive materials 50 are introduced into the photosensitive material arraying apparatus 1.

Referring to a transporting system in this photosensitive material arraying device 1, the system includes a transport passage for receiving the developed and dried photosensitive materials 50 and forwarding them toward a transport conveyer 18, and a photosensitive material receiving mechanism 19 for receiving the materials in the unit of e.g. one film roll amount.

Figure 2:
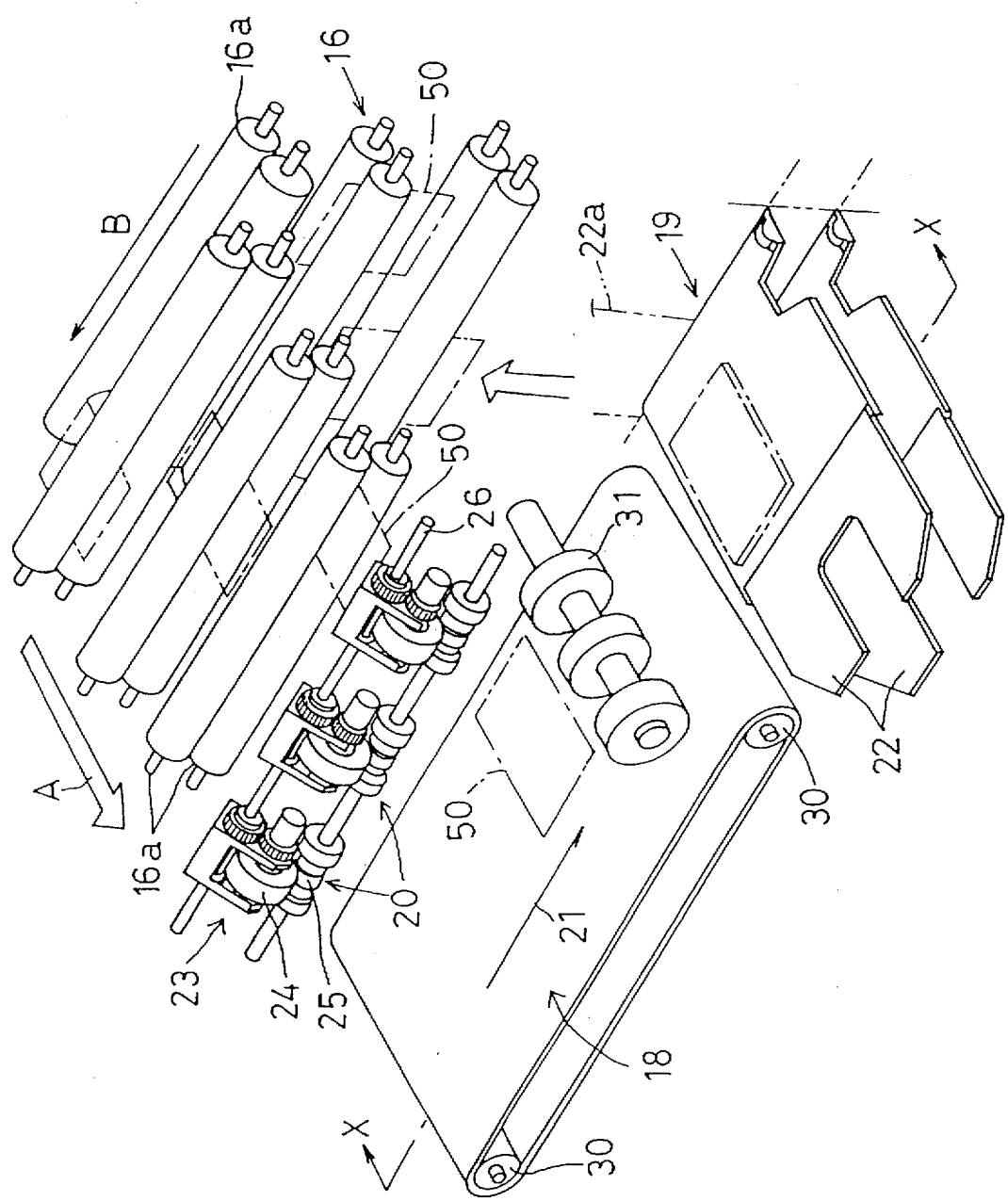
FIG. 2 is a perspective view showing the construction of the photosensitive material arraying apparatus around an exit of photosensitive material transport passage.

More particularly, the transport conveyer 18, as shown in FIG. 2, is disposed between an exit 20 of the transport passage in this straying apparatus and the photosensitive material receiving mechanism 19. And, this conveyer 18 includes a conveying passage 21 extending substantially normal to a discharging direction A of the materials 50 discharged from the exit 20. Accordingly, this transport conveyer 18 receives the photosensitive materials 50 transported in the three-lane, phase-staggered formation at positions differing in the moving direction of the conveyer and conveys these materials 50 onto receiving plates 22 of the photosensitive material receiving mechanism 19.

Next, the essential construction of the arraying apparatus adjacent the exit 20 of the transport passage will be described in details.

As described hereinbefore, along the transport passage of the photosensitive materials 50, there are provided the plurality of transporting pinch roller mechanisms 16 each of which is comprised of a pair of pinch rollers 16a as described hereinbefore. Further, at the last stage position of the transport passage, there is disposed a discharging pinch roller mechanism 23 having a higher film transporting speed than the transporting pinch roller mechanisms 16.

As shown in FIG. 2, in the juxtaposing direction B (i.e. the direction along the length of the transport conveyer 18) of the photosensitive materials 50, only one roller pair 16a, i.e. one transporting pinch roller mechanism 16, is provided.

Figure 3:
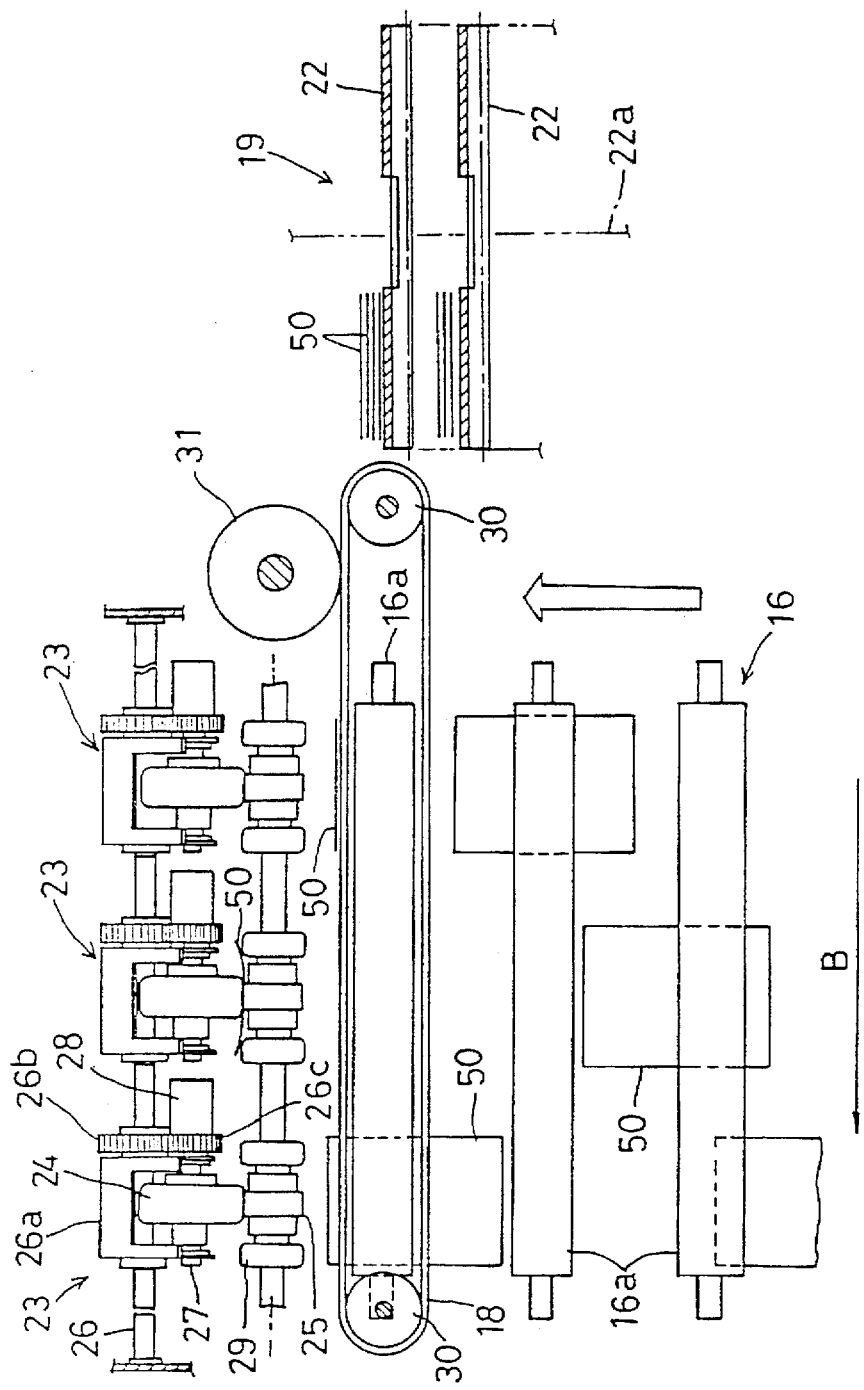
FIG. 3 is a section view taken along a line X—X in FIG. 2.
Figure 4:
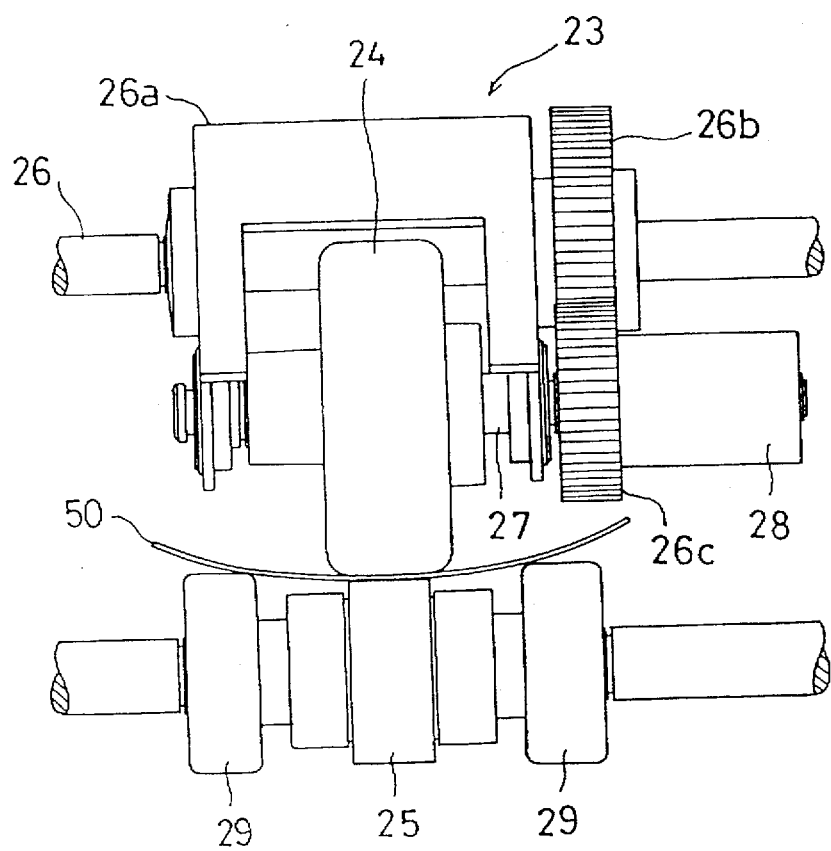
FIG. 4 is a detailed view showing a discharging pinch roller mechanism with other peripheral components.

As shown in FIG. 2, FIG. 3 and FIG. 4, the discharging pinch roller mechanism 23 includes large drive rollers 24 and small driven roller 25 contactable with the respective drive rollers 24 to be rotatable in unison therewith. The drive rollers 24 are mounted on respective roller shafts 27 supported to frames 26a which in turn are supported on a common drive shaft 26. Between the drive shaft 26 and each roller shaft 27, there is interposed a gear drive transmission mechanism 26b. Further, between a driven gear 26c of the gear drive transmission mechanism 26b and the roller shaft 27 of the drive roller 24, there is interposed a torque limiter 28 for rendering the roller 24 freely rotatable in response to a torque greater than a predetermined value. In this instant embodiment, this torque limiter 28 is the so-called magnet particle type. However, any other type of torque limiter may be employed instead.

Further, coaxially with the drive roller 25, there are disposed guide to rollers 29 across the driven roller 25. And, these guide rollers 29 have a greater diameter than the driven roller 25.

As shown in FIG. 2, on the outer side of the exit 20 of the transport passage, the transport conveyer 18 is provided as described hereinbefore. This transport conveyer 18 may be driven in an intermittent manner in association with discharging operation of the photosensitive material 50. This intermittent drive of the transport conveyer 18 is effected by a drive unit (not shown) operatively connected with a pulley 30 of the conveyer. Numeral 31 denotes a press roller.

Downstream of the transport conveyer 18, there is provided the photosensitive material receiving mechanism 19 which includes a plurality of stages of receiving plates 22 For receiving the photosensitive materials 50 aligned with each other. Though not shown, the receiving plates 22 are mounted on a vertically movable endless belt 22a, so that each plate 22 may be moved to a horizontal position level and joining with the transport conveyer 18. In operation, when the photosensitive materials 50 corresponding to frames of one roll of film are stacked onto one receiving plate 22, this plate 22 is moved downward to bring the next upper receiving plate 22 to the horizontal level position for receiving further photosensitive materials 50 to be forwarded from the transport conveyer 18.

Next, the operations of the photosensitive material arraying apparatus 1 having the above construction will be described.

In the following description, the photosensitive materials 50 having standard widths ranging e.g. between 89 mm and 6 inches are used as an example.

As described hereinbefore, when the materials 50 are transported to this apparatus 1, these materials 50 are arranged in the three-lane, phase-staggered formation as shown in FIGS. 2 and 3.

In the transport passage, the materials 50 are transported to the passage exit 20 by means of the plurality of transporting pinch roller mechanisms 16 disposed along the transport passage and providing substantially same transporting speed. In this, when a leading end of the material comes to be engaged by the discharging pinch roller mechanism 23, slippage occurs on the side of this discharging pinch roller mechanism 23 due to the function of its torque limiter 28, so that the transportation of the material 50 is continued with the material 50 is subjected to a tension lower than the predetermined value. Then, when the trailing end of this material 50 has left the last transporting pinch roller mechanism 16, the material 50 is accelerated up to the high speed provided by the discharging pinch roller mechanism 23 and discharged at this high speed onto the transport conveyer 18. Accordingly, the transported material will not stagnate against the discharging pinch roller mechanism 23. Further, in spite of the high-speed discharging operation of the material 50 from the transport passage exit 20, the photosensitive material 50 will not be damaged thereby.

In the above, the transporting speed of the discharging pinch roller mechanism 23 is set to be about 2 to 15 times higher than that of the transporting pinch roller mechanisms 16. However, by using the above-described construction, such speed setting will not cause any inconvenience.

Further, as described hereinbefore, at the appropriate opposed positions (i.e. positions at which the photosensitive material 50 may be properly supported in its width direction) across the driven roller 25 of the discharging pinch roller mechanism 23, the guide rollers 29 larger in diameter than the driven roller 25 are provided. Therefore, the photosensitive material 50 is discharged under the curved condition with its opposed edges being slight raised relative to the central portion. Then, when discharging a long photosensitive material such as of a panoramic size, there occur no such problems as sagging of the leading end of this photosensitive material 50, or the sagging end inadvertently coming into inadvertent contact with the transport conveyer 18 to generate static electricity which in turn sticks the material 50 to the conveyer 18. Furthermore, when such long photosensitive material is discharged from the discharging pinch roller mechanism disposed on the side of the photosensitive material receiving mechanism, there occurs no overlapping interference between this material and a foregoing material being transported on the conveyer toward the receiving mechanism.

On the transport conveyer 18, the discharged photosensitive materials 50 are conveyed in the direction normal to the discharging direction by the intermittent action of the conveyer 18. In this, for each one of the photosensitive materials 50 transported in the three-lane, phase-staggered formation, the discharging operation and the conveying operation by the conveyer 18 to the receiving plate 22 are repeatedly carried out. In other words, when one photosensitive material 50 is present on the conveyer 18, the next material 50 is maintained at a position where the discharging pinch roller mechanism 23 has not completed its discharging operation. Then, the photosensitive materials 50 discharged one after another in the above-described manner are stacked on the receiving plate 22 by the intermittent action of the transport conveyer 18, so that the photosensitive materials 50 may be re-arranged and stacked according to the order of the frames of the film.

For setting of the timing of intermittent drive of the transport conveyer 18, each trailing end of the photosensitive material 50 discharged at the high speed is detected by means of an optical sensor (not shown), and upon lapse of a predetermined time period after passage of the trailing end, the transport conveyer 18 is driven. Whereas, the movement of the material 50 onto the receiving plate 22 is detected by means of an optical sensor (not shown) and upon this detection the operation of the conveyer 18 is suspended.

Further, based on the signal from the unillustrated optical sensor relating to the detection of the trailing end of the photosensitive material 50, the number of the passed photosensitive materials 50 is counted, and a control circuit (not shown) compares this number with the number of frames of one roll of film. Then, when all sheets of one film roll amount of photosensitive materials 50 have been stacked onto one receiving plate 22, this plate 22 is lowered to bring the next plate to the position for receiving further materials.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A photosensitive material transporting apparatus comprising:
   a transport passage for transporting developed photosensitive material;
   a transporting pinch roller mechanism disposed along the transport passage of the photosensitive material and capable of transporting the material by pinching it;
   a discharging pinch roller mechanism disposed at an exit of the transport passage and having a higher transporting speed than the transporting pinch roller mechanism; and
   a torque limiter attached to a roller of the discharging pinch roller mechanism for rendering the roller freely rotatable in response to a torque greater than a predetermined value.

2. A photosensitive material transporting apparatus as claimed in claim 1, wherein the discharging pinch roller mechanism includes a large drive roller and a small driven roller contactable with the drive roller to be rotatable in unison therewith and a plurality of guide rollers coaxial with the driven roller and disposed across the driven roller along the conveying passage of the transport conveyer, and the guide roller has a greater diameter than the driven roller.

3. A photosensitive material transporting apparatus as claimed in claim 1, wherein said torque limiter is a magnet particle type torque limiter.

4. A photosensitive material transporting apparatus comprising:
   a transport passage for transporting a plurality of developed photosensitive materials in parallel with each other with a phase difference therebetween in a transporting direction thereof;
   a photosensitive material receiving mechanism disposed downstream of the transport passage for receiving the photosensitive materials;
   a transport conveyer disposed between an exit of the transport passage and the photosensitive material receiving mechanism and having a conveying passage extending substantially normal to a discharging direction of the photosensitive materials discharged from the exit;
   a transporting pinch roller mechanism disposed along the transport passage of the photosensitive materials and capable of transporting the materials by pinching them;
   a discharging pinch roller mechanism disposed at the exit of the transport passage and having a higher transporting speed than the transporting pinch roller mechanism; and
   a torque limiter attached to a roller of of the discharging pinch roller mechanism for rendering the roller freely rotatable in response to a torque greater than a predetermined value.

5. A photosensitive material transporting apparatus as claimed in claim 4, wherein the discharging pinch roller mechanism includes a large drive roller and a small driven roller contactable with the drive roller to be rotatable in unison therewith and a plurality of guide rollers coaxial with the driven roller and disposed across the driven roller along the conveying passage of the transport conveyer, and the guide roller has a greater diameter than the driven roller.

6. A photosensitive material transporting apparatus as claimed in claim 4, wherein said torque limiter is a magnet particle type torque limiter.

* * * * *